(12) United States Patent
Yang et al.

(10) Patent No.: US 10,841,046 B2
(45) Date of Patent: Nov. 17, 2020

(54) METHOD FOR SIGNAL TRANSMISSION, AND APPARATUS THEREFOR

(71) Applicant: LG ELECTRONICS INC., Seoul (KR)

(72) Inventors: Suckchel Yang, Seoul (KR); Joonkui Ahn, Seoul (KR); Hanbyul Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,986

(22) PCT Filed: Nov. 7, 2016

(86) PCT No.: PCT/KR2016/012751
§ 371 (c)(1),
(2) Date: May 4, 2018

(87) PCT Pub. No.: WO2017/078501
PCT Pub. Date: Nov. 5, 2017

(65) Prior Publication Data
US 2018/0331792 A1 Nov. 15, 2018

Related U.S. Application Data

(60) Provisional application No. 62/251,116, filed on Nov. 5, 2015.

(51) Int. Cl.
*H04L 1/18* (2006.01)
*H04W 72/04* (2009.01)
(Continued)

(52) U.S. Cl.
CPC .......... *H04L 1/1887* (2013.01); *H04L 1/0086* (2013.01); *H04L 1/1812* (2013.01);
(Continued)

(58) Field of Classification Search
CPC ... H04W 72/042; H04W 72/04; H04W 72/14; H04W 72/12; H04W 72/0413; H04W 72/1268; H04W 72/02; H04W 72/0446
See application file for complete search history.

(56) References Cited

U.S. PATENT DOCUMENTS

2010/0081443 A1* 4/2010 Meyer ............... H04W 72/1289
455/450
2010/0111024 A1* 5/2010 Fan ...................... H04L 1/1854
370/329

(Continued)

FOREIGN PATENT DOCUMENTS

| KR | 1020100139036 | 12/2010 |
| WO | 2013048056 | 4/2013 |

OTHER PUBLICATIONS

PCT International Application No. PCT/KR2016/012751, Written Opinion of the International Searching Authority dated Feb. 13, 2017, 16 pages.

(Continued)

*Primary Examiner* — Asad M Nawaz
*Assistant Examiner* — Najeeb Ansari
(74) *Attorney, Agent, or Firm* — Lee Hong Degerman Kang Waimey

(57) ABSTRACT

The present invention relates to a wireless communication system. Specifically, the present invention relates to a method comprising the steps of: receiving uplink semi-persistent scheduling (SPS) configuration information; and transmitting a physical uplink shared channel (PUSCH) in a subframe which is periodically configured according to the uplink SPS configuration information, wherein the PUSCH includes indication information indicating whether data of the PUSCH is new SPS data or retransmission SPS data, and an apparatus therefor.

16 Claims, 9 Drawing Sheets

(51) Int. Cl.
*H04L 5/00* (2006.01)
*H04L 1/00* (2006.01)

(52) U.S. Cl.
CPC .......... *H04L 1/1896* (2013.01); *H04L 5/0044* (2013.01); *H04L 5/0053* (2013.01); *H04L 5/0094* (2013.01); *H04W 72/04* (2013.01); *H04W 72/0413* (2013.01); *H04L 5/0051* (2013.01)

(56) References Cited

U.S. PATENT DOCUMENTS

| | | | |
|---|---|---|---|
| 2013/0016686 A1* | 1/2013 | Li | H04L 1/1822 370/329 |
| 2013/0114573 A1 | 5/2013 | Suzuki et al. | |
| 2014/0348050 A1* | 11/2014 | Kim | H04W 72/1273 370/312 |
| 2015/0271798 A1* | 9/2015 | Chen | H04L 1/1812 370/329 |
| 2015/0382372 A1* | 12/2015 | Vajapeyam | H04W 24/10 370/329 |
| 2016/0242176 A1* | 8/2016 | Sun | H04W 72/0446 |

OTHER PUBLICATIONS

LG Electronics, "Discussion on PUSCH transmissions for MTC", 3GPP TSG RAN WG1 Meeting #82bis, R1-155369, Oct. 2015, 3 pages.

ZTE, "UCI transmission on PUSCH for eCA", 3GPP TSG RAN WG1 Meeting #82bis, R1-155227, Oct. 2015, 3 pages.

European Patent Office Application Serial No. 16862516.8, Search Report dated May 10, 2019, 8 pages.

CMCC, "Potential issues on enhanced SPS mechanism", 3GPP TSG RAN WG2 Meeting #91bis, R2-154142, XP051004737, Oct. 2015, 4 pages.

* cited by examiner

PUCCH format 1a and 1b structure (normal CP case)

METHOD FOR SIGNAL TRANSMISSION, AND APPARATUS THEREFOR

CROSS-REFERENCE TO RELATED APPLICATIONS

This application is the National Stage filing under 35 U.S.C. 371 of International Application No. PCT/KR2016/012751, filed on Nov. 7, 2016, which claims the benefit of U.S. Provisional Application No. 62/251,116, filed on Nov. 5, 2015, the contents of which are all hereby incorporated by reference herein in their entirety.

TECHNICAL FIELD

The present invention relates to a wireless communication system and, more particularly, to a method for transmitting signals and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Task

An object of the present invention is to provide a method for efficiently transmitting signals in a wireless communication system and an apparatus for the same.

The technical problems solved by the present invention are not limited to the above technical problems and those skilled in the art may understand other technical problems from the following description.

Technical Solutions

In one technical aspect of the present invention, provided herein is a method of performing uplink transmission by a user equipment in a wireless communication system, including receiving uplink SPS (semi-persistent scheduling) configuration information and transmitting PUSCH (physical uplink shared channel) in a subframe periodically configured according to the uplink SPS configuration information, wherein the PUSCH includes indication information indicating whether data in the PUSCH is new SPS data or retransmission SPS data.

In another technical aspect of the present invention, provided herein is a user equipment in a wireless communication system, including a radio frequency (RF) unit and a processor configured to receive uplink SPS (semi-persistent scheduling) configuration information and transmit PUSCH (physical uplink shared channel) in a subframe periodically configured according to the uplink SPS configuration information, wherein the PUSCH includes indication information indicating whether data in the PUSCH is new SPS data or retransmission SPS data.

Preferably, the indication information may be identified by a 1-bit indicator.

Preferably, the indication information may be identified based on an index of a PRB (physical resource block) on which the PUSCH is transmitted.

Preferably, the indication information may be identified based on a sequence used for DMRS (demodulation reference signal) of the PUSCH.

Preferably, the indication information may be identified based on a scrambling sequence used for the PUSCH.

Preferably, a period of the periodically configured subframe may be smaller than 10 ms.

Advantageous Effects

According to the present invention, it is possible to efficiently transmit signals in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
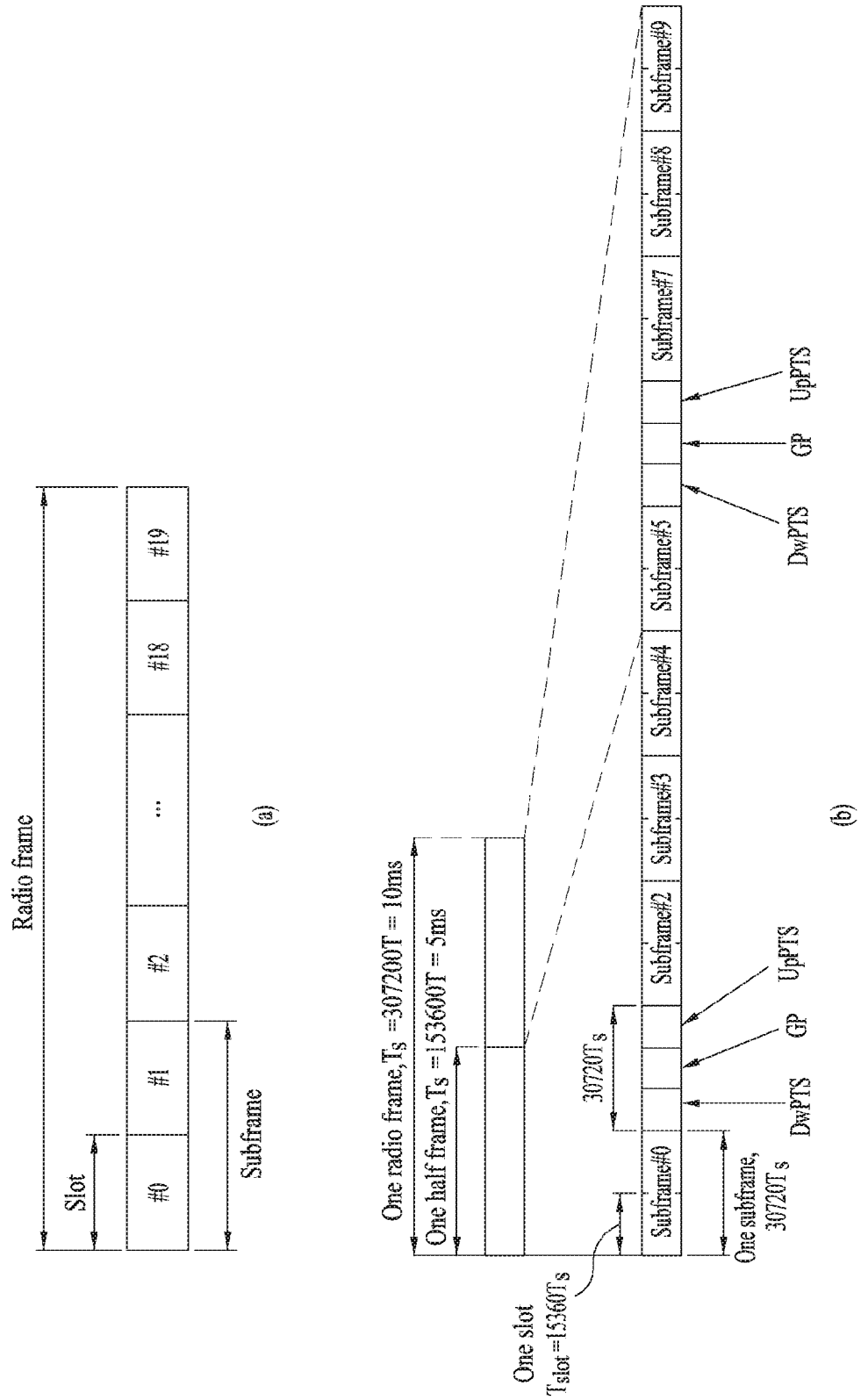
FIG. 1 illustrates a radio frame structure.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure for FDD (frequency division duplex) and a type-2 radio frame structure for TDD (time division duplex).

FIG. 1(a) illustrates a type-1 radio frame structure. A downlink radio frame includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6.

FIG. 1(b) illustrates a type-2 radio frame structure. The type-2 radio frame includes 2 half frames. Each half frame includes 5 subframes. One subframe consists of 2 slots.

Table 1 shows UL-DL configurations (UL-DL Cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS lengths according to special subframe configurations. In Table 2, Ts denotes sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The radio frame structure is exemplary and the number of subframes, the number of slots and the number of symbols in a radio frame can vary.

Figure 2:
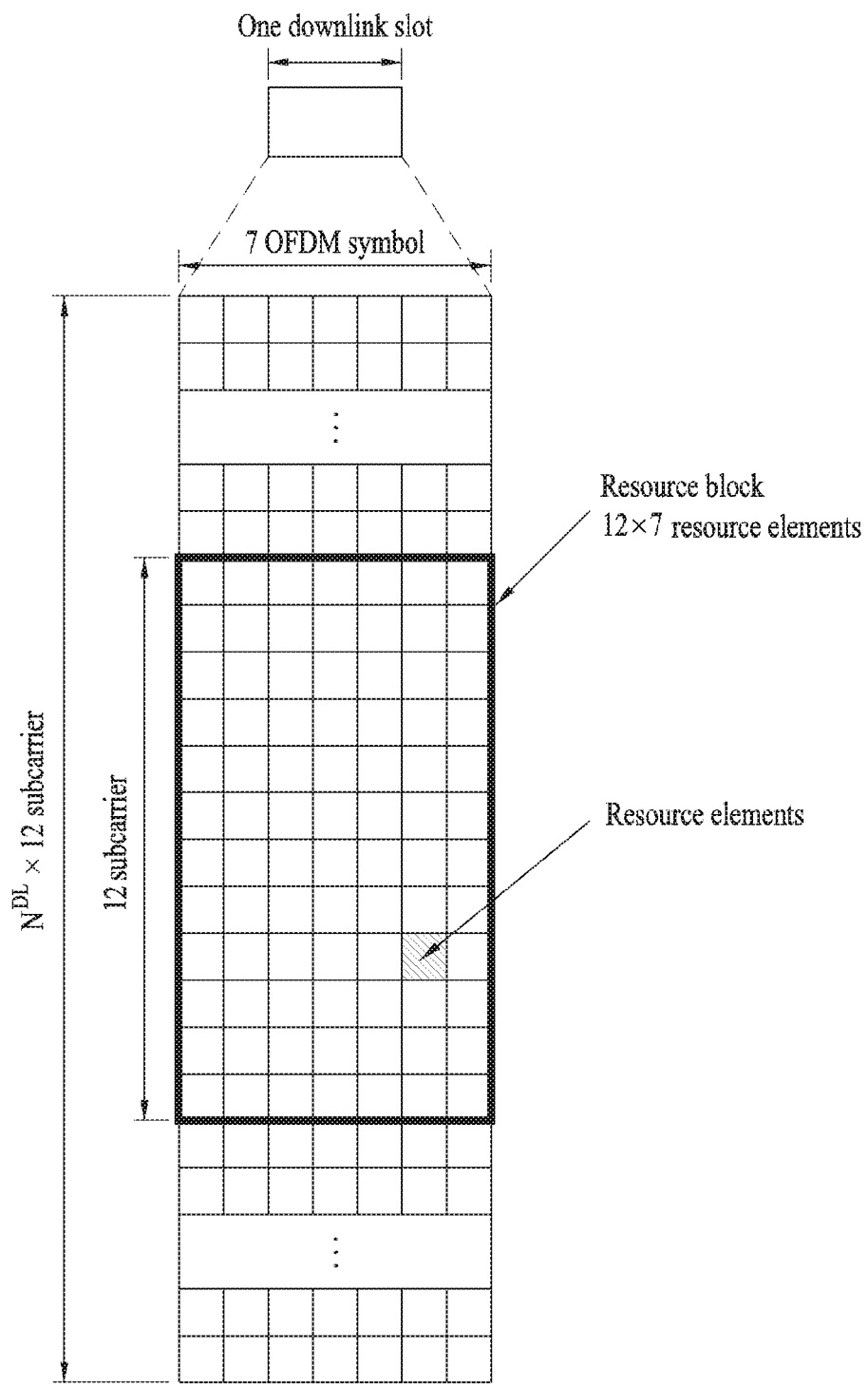
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
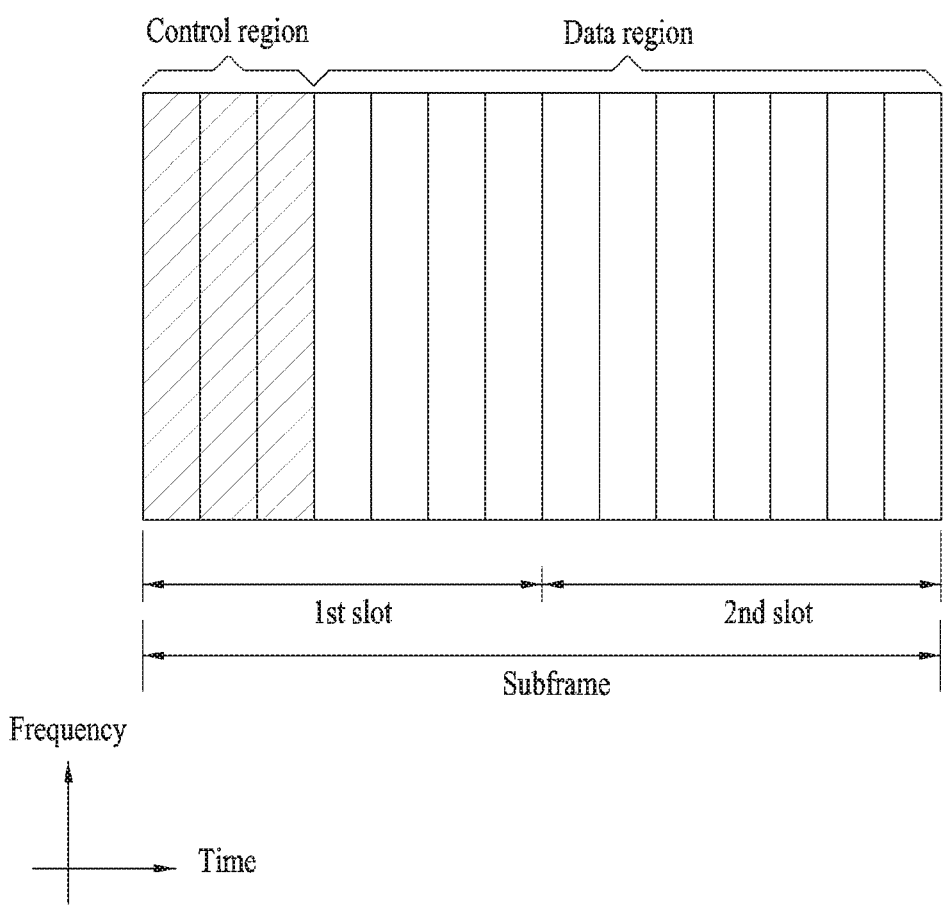
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

PDCCH carries a message known as DCI (downlink control information, and the DCI includes resource allocation for a single UE or a UE group and other control information. Generally, a plurality of PDCCHs can be transmitted in a single subframe. Each PDCCH is transmitted using at least one CCE (control channel element), and each CCE corresponds to 4 resource elements of 9 sets. The 4 resource elements are referred to as REG (resource element group). 4 QPSK symbols are mapped to a single REG. A resource element assigned to a reference signal is not included in REG. Hence, the total number of REGs within a given OFDM symbol varies depending on a presence or non-presence of a cell-specific reference signal. The REG concept (i.e., a group unit mapping, each group including 4 resource elements) is used for other downlink control channels (PCFICH, PHICH). In particular, REG is used as a basic resource unit of a control region. 4 PDCCH formats are supported as listed in Table 3.

TABLE 3

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are consecutively used in a manner of being numbered. In order to simplify a decoding process, PDCCH having a format configured with n CCEs can start with a CCE having the number corresponding to a multiple of n only. The number of CCEs used for a transmission of a specific PDCCH is determined by a base station in accordance with a channel state. For instance, a single CCE may be enough for a case of a PDCCH for a user equipment having a good downlink channel. Yet, in case of a PDCCH for a user equipment having a poor channel (e.g., a user equipment located nearby a cell edge), 8 CCEs may be requested to obtain sufficient robustness. Moreover, a power level of PDCCH can be adjusted to cope with a channel condition.

A method introduced into LTE is to define a CCE location of a limited set at which PDCCH can be located for each UE. The CCE location of the limited set can be named a search space (SS). In LTE, an SS (search space) has a size differing in accordance with each PDCCH format. And, a USS (UE-specific search space) and a CSS (common search space) are separately defined. The USS is individually configured for each user equipment and a CSS range is known to all user equipments. The USS and CSS may overlap each other for a given user equipment. In case of having a considerably small SS, when if some CCE locations are assigned in an SS for a specific UE, a base station may not find CCE resources to carry PDCCH to all available UEs within a corresponding subframe. In order to minimize a possibility that the above blocking may continue to a next subframe, a UE-specific hopping sequence is applied to a start location of a USS. In case that a plurality of cells are merged (cf. FIG. 5), CSS is configured to PCell only and USS is configured for each cell.

Table 4 shows sizes of CSS and USS.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to control an operation overhead in accordance with a blind decoding attempt, a user equipment is not requested to search all the defined DCI formats simultaneously. Generally, a user equipment always searches a USS for a format 0 and a format 1A. Each of the format 0 and the format 1A has the same size but is identified by a flag in a message. Moreover, the user equipment may be requested to receive another format (i.e., a format 1, a format 1B or a format 2 in accordance with a PDSCH transmission mode set by a base station) in addition. A user equipment searches a CSS for a format 1A and a format 1C. And, the user equipment may be configured to search for a format 3 or a format 3A. The format 3/3A has the same size like the case of the format 0/1A and is identified by scrambling CRC with a different identifier rather than a UE-specific identifier. A PDSCH transmission mode scheme according to a transmission mode and information contents of DCI formats are listed as follows.

Figure 4:
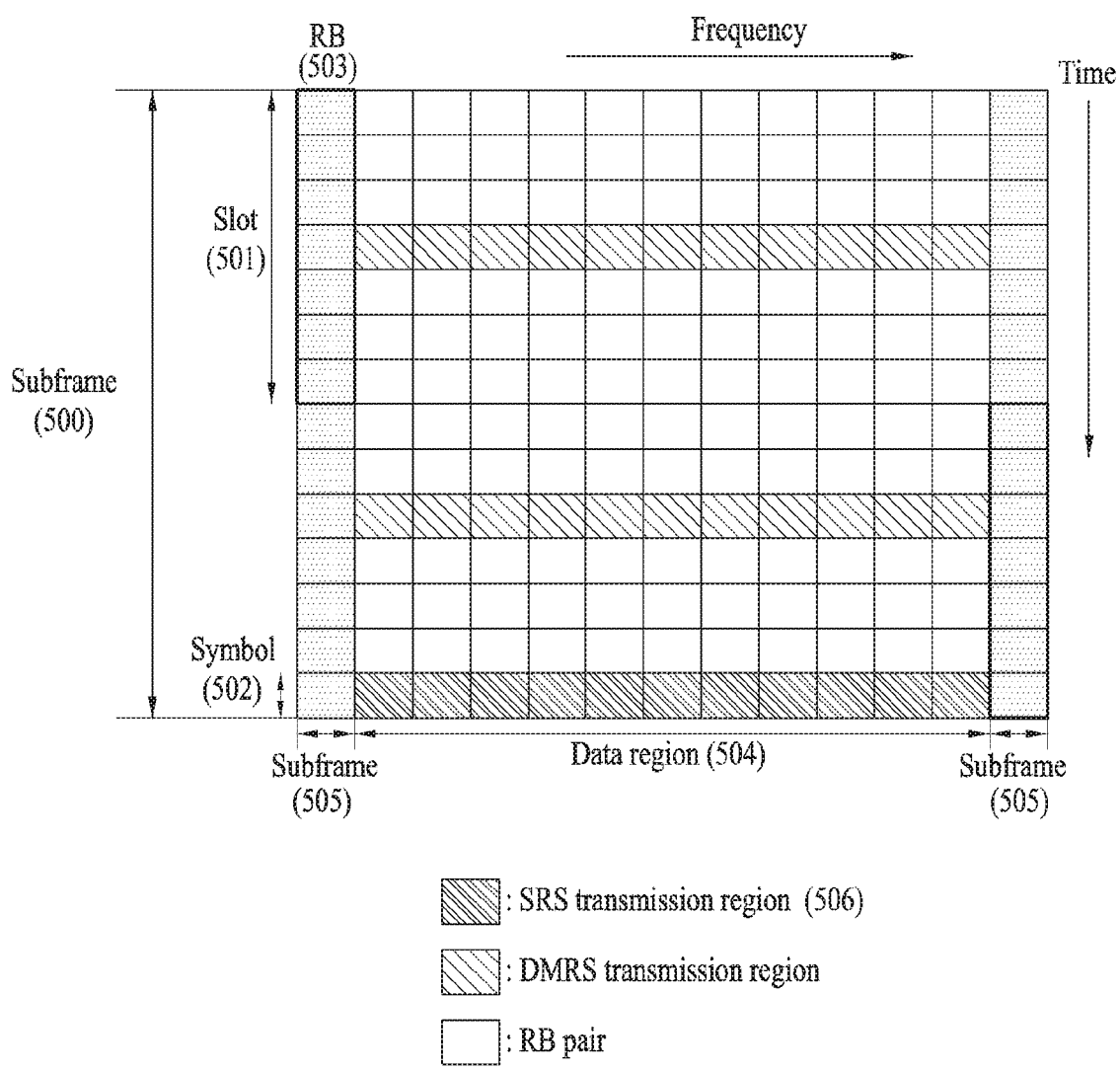
FIG. 4 illustrates the structure of an uplink subframe.

Transmission Mode (TM)
Transmission Mode 1: Transmission from a single base station antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Single-antenna port (Port 5) Transmission
Transmission Mode 8: Double-layer transmission (Port 7 and Port 8) or single-antenna port (Port 7 or Port 8) Transmission
Transmission Mode 9: Maximum 8-layer transmission (Ports 7 to 14) or Single-antenna port (Port 7 or Port 8) Transmission
DCI Formats
Format 0: Resource grants for the PUSCH transmissions (uplink)
Format 1: Resource allocations for single codeword PDSCH transmissions (transmission modes 1, 2 and 7)
Format 1A: Compact signaling of resource allocations for single codeword PDSCH (all modes)
Format 1B: Compact resource allocations for PDSCH (mode 6) using rank-1 closed loop precoding
Format 1C: Very compact resource allocations for PDSCH (e.g., paging/broadcast system information)
Format 1D: Compact resource allocations for PDSCH (mode 5) using multi-user MIMO
Format 2: Resource allocations for PDSCH (mode 4) for closed-loop MIMO operation
Format 2A: Resource allocations for PDSCH (mode 3) for open-loop MIMO operation
Format 3/3A: Power control commands for PUCCH and PUSCH with 2-bit/1-bit power adjustments
FIG. 4 illustrates an uplink subframe structure.
Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.
HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.
Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

Table 5 shows the mapping relationship between PUCCH formats and UCI in LTE.

TABLE 5

| PUCCH format | UCI (Uplink Control Information) |
|---|---|
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 5:
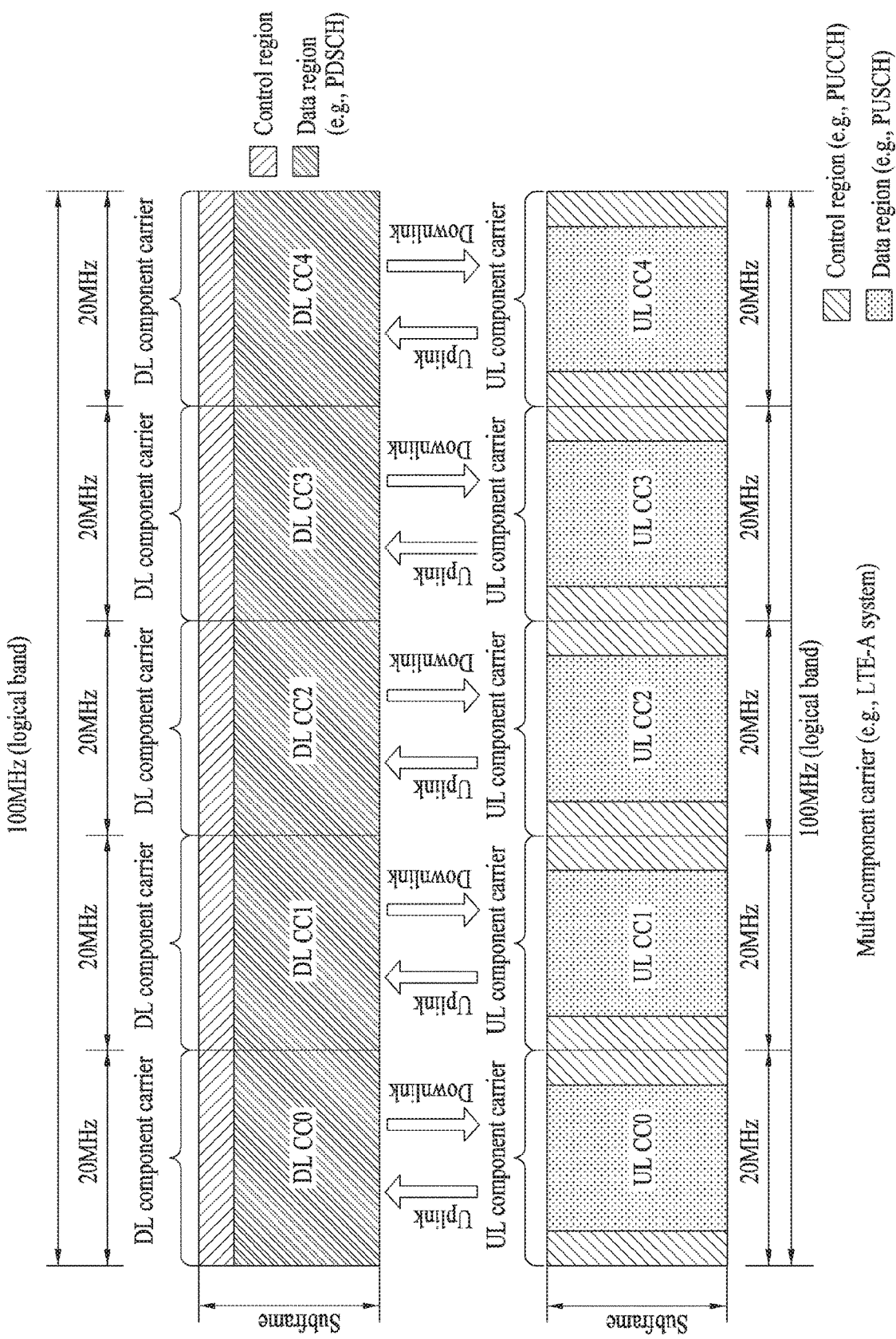
FIG. 5 illustrates a carrier aggregation (CA)-based wireless communication system.

FIG. 5 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 5, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC.

This specific CC can be referred to as a Primary CC (PCC) (or anchor CC) and other CCs can be referred to as Secondary CCs (SCCs).

In LTE-A, the concept of a cell is used to manage radio resources [refer to 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC Connected state, for which CA is not set or which does not support CA. On the other hand, one or more serving cells exist, including a PCell and entire SCells, for a UE in an RRC CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner.

The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 6:
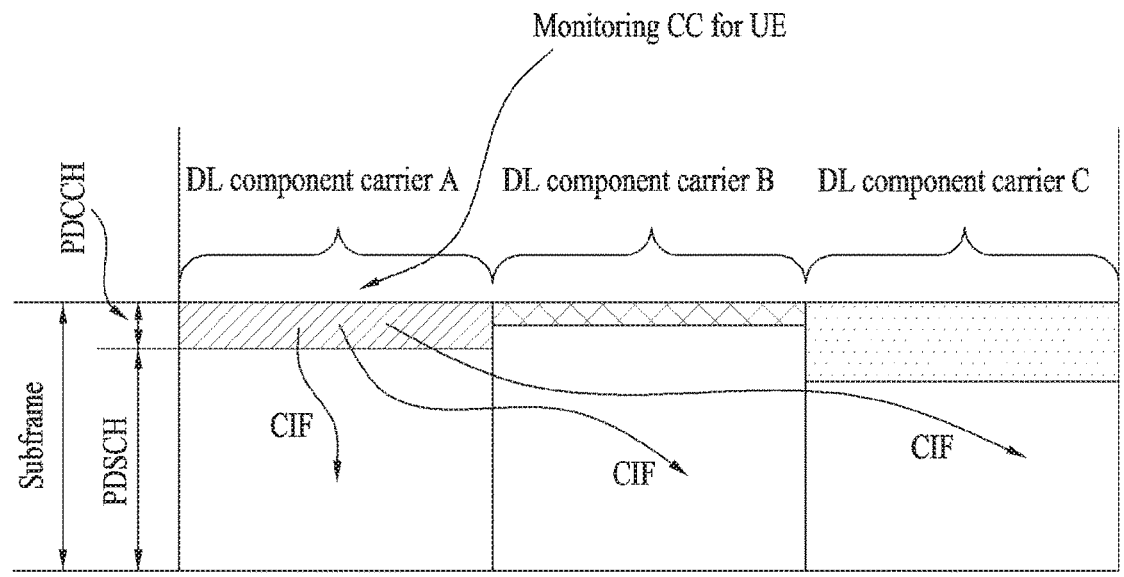
FIG. 6 illustrates a scheduling method when a plurality of cells is configured.

FIG. 6 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

Figure 7:
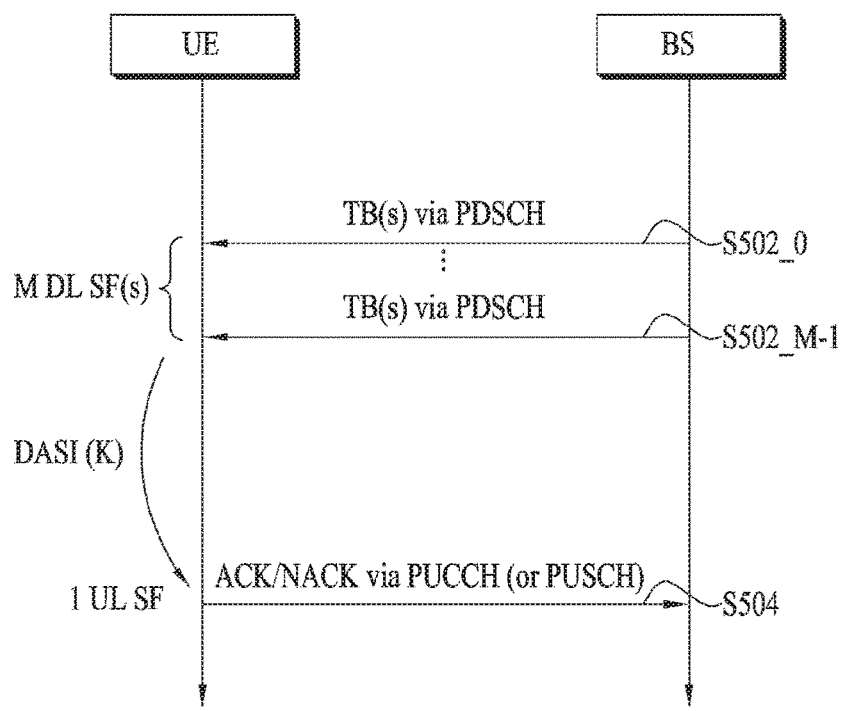
FIG. 7 illustrates a TDD UL ACK/NACK transmission process in a single cell situation.

FIG. 7 illustrates a TDD UL ACK/NACK transmission process in a single cell situation.

Referring to FIG. 7, a UE can receive one or more DL signals (e.g. PDSCH signals) in M DL subframes (SFs) (S502_0 to S502_M−1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502_M−1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK can be transmitted through a PUSCH when a PUSCH is transmitted at ACK/NACK transmission time. Various PUCCH formats shown in Table 5 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 6 shows DASI (K: {k0, k1, . . . , $k_{M-1}$}) defined in LTE(-A). Table 6 shows spacing between a UL subframe transmitting ACK/NACK and a DL subframe relating to the UL subframe. Specifically, when a PDCCH that indicates PDSCH transmission and/or (downlink) SPS release is present in a subframe n−k (k∈K), the UE transmits ACK/NACK in a subframe n.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |

TABLE 6-continued

| UL-DL Configuration | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, in FDD, ACK/NACK for data received in a single DL subframe is transmitted a single UL subframe, where k=4. Namely, in case that PDSCH transmission and/or SPS release PDCCH exists in subframe n−4, a user equipment transmits a corresponding ACK/NACK in subframe n.

Figure 8:
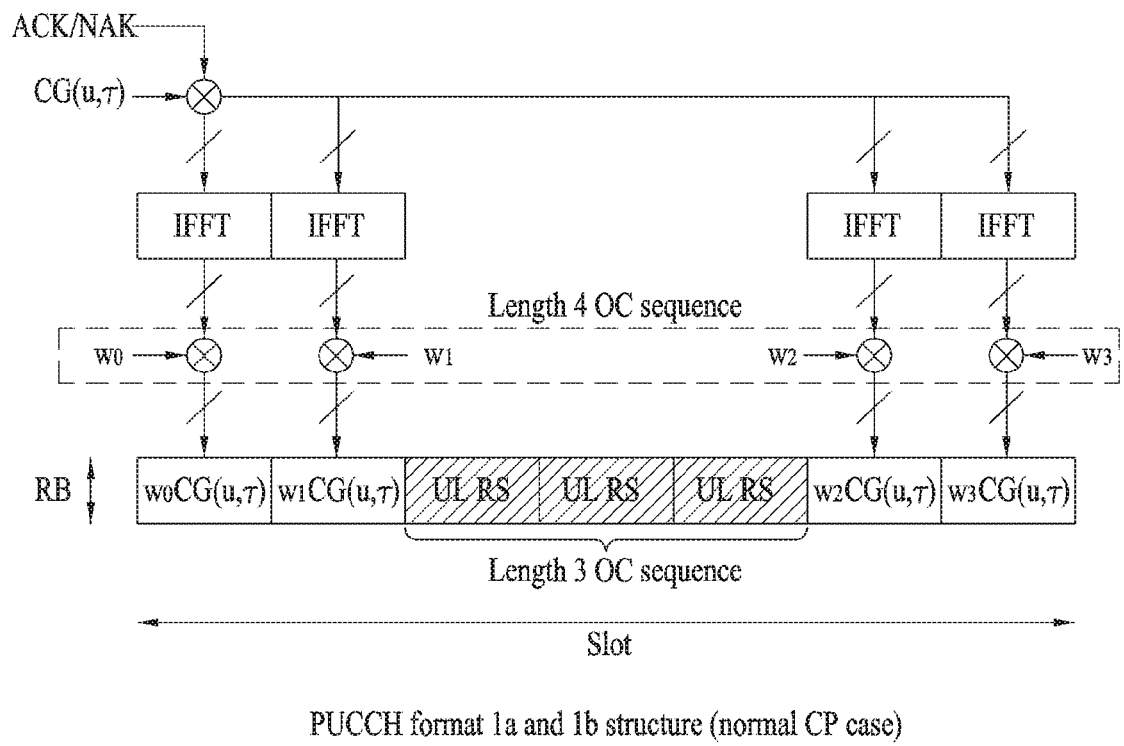
FIG. 8 illustrates slot level structures of Physical Uplink Control Channel (PUCCH) formats 1a/1b.

FIG. 8 illustrates a slot level structure of Physical Uplink Control Channel (PUCCH) format 1a/1b. PUCCH format 1a/1b is used for ACK/NACK transmission. In case of a normal CP, SC-FDMA #2/#3/#4 is used for DM RS (Demodulation Reference Signal) transmission. In case of an extended CP, SC-FDMA #2/#3 is used for DM RS transmission. Hence, 4 SC-FDMA symbols in a slot are used for ACK/NACK transmission. For clarity, PUCCH format 1a/1b shall be commonly called PUCCH format 1.

Referring to FIG. 8, 1-bit [b(0)] ACK/NACK information and 2-bit [b(0)b(1)] ACK/NACK information are modulated by BPSK (Binary Phase Shift Keying) modulation scheme and QPSK (Quadrature Phase Shift Keying) modulation scheme, respectively, and a single ACK/NACK modulated symbol is generated [d0]. In the ACK/NACK information, each bit [b(i), i=0,1] indicates HARQ response for a corresponding transport block. In case of a positive ACK, the corresponding bit is given as 1. In case of a negative ACK (NACK), the corresponding bit is given as 0. Table 7 shows a modulation table defined for PUCCH format 1a/1b in the legacy LTE.

TABLE 7

| PUCCH format | b(0), . . . , b($M_{bit}$ − 1) | d(0) |
|---|---|---|
| 1a | 0 | 1 |
| | 1 | −1 |
| 1b | 00 | 1 |
| | 01 | −j |
| | 10 | j |
| | 11 | −1 |

PUCCH format 1a/1b performs a cyclic shift ($\alpha cs$, x) in a frequency domain and performs a spread in a time domain using orthogonal spread code (e.g., Walsh-Hadamard, DFT code) (w0,w1,w2,w3). Since code multiplexing is used in each of the frequency and time domains, more user equipments can be multiplexed on the same PUCCH RB.

Figure 9:
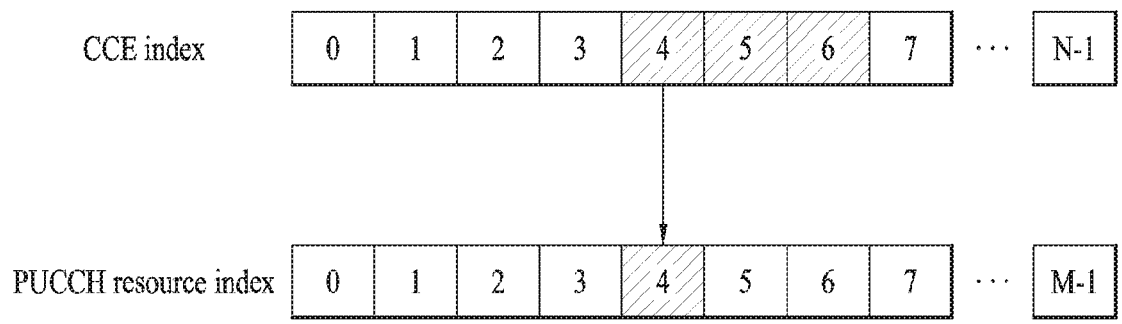
FIG. 9 illustrates an example for deciding PUCCH format 1a/1b resources for ACK/NACK.

FIG. 9 shows an example for deciding PUCCH format 1a/1b resources for ACK/NACK. PUCCH 1a/1b resources for ACK/NACK are not pre-allocated to each UE, and several UEs located in the cell are configured to divisionally use several PUCCH resources at every time point. In more detail, PUCCH 1a/1b resources used for ACK/NACK transmission of a UE may correspond to a PDCCH that carries scheduling information of the corresponding DL data. The entire region to which a PDCCH is transmitted in each DL subframe is comprised of a plurality of Control Channel Elements (CCEs), and a PDCCH transmitted to the UE is comprised of one or more CCEs. The UE may transmit ACK/NACK through PUCCH resources (e.g., first CCE) from among CCEs constructing a PDCCH received by the UE.

Referring to FIG. 9, each block in a Downlink Component Carrier (DL CC) represents a CCE and each block in an Uplink Component Carrier (UL CC) indicates a PUCCH resource. Each PUCCH resource index may correspond to a PUCCH resource for an ACK/NACK signal. If information on a PDSCH is delivered on a PDCCH composed of CCEs #4~#6, as shown in FIG. 9, a UE transmits an ACK/NACK signal on PUCCH #4 corresponding to CCE #4, the first CCE of the PDCCH. FIG. 9 illustrates a case in which a maximum of M PUCCHs are present in the UL CC when a maximum of N CCEs exist in the DL CC. Though N may be identical to M (M=M), N may differ from M and CCEs may be mapped to PUCCHs in an overlapped manner.

Specifically, a PUCCH 1a/1b resource index in an LTE system is determined as follows.

$$n^{(1)}_{PUCCH} + n_{CCE} + N^{(1)}_{PUCCH} \quad \text{[Equation 1]}$$

Here, $n^{(1)}_{PUCCH}$ represents a resource index of PUCCH format 1a/1b for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift (CS), an orthogonal spreading code and a Physical Resource Block (PRB) for PUCCH formats 1a/1b are obtained from $n^{(1)}_{PUCCH}$.

In the following, SPS (semi-persistent scheduling) and a method of semi-statically allocating PUDDCH resource for ACK/NACK in an SPS operation are described.

Regarding unicast data, a resource is dynamically allocated per subframe by scheduling. On the other hand, SPS reserves a resource for traffic periodically generated with medium/low speed like VoIP (voice over internet protocol) or streaming in advance. By reserving a resource for a specific traffic in advance, SPS can reduce scheduling overhead and allocate resources stably.

In LTE, in case of DL/UL (uplink/downlink) SPS, information on a subframe for SPS Tx/Rx (transmission/reception) is given by RRC (radio resource control) signaling and activation, reactivation and release of SPS is performed through PDCCH. Subframe information for SPS includes a subframe interval, and a subframe offset. For clarity, PDCCH for indicating SPS activation/reactivation/release shall be named SPS PDCCH. SPS PDCCH carries MCS (modulation and coding scheme) information and RB allocation information for Tx/Rx. Regarding SPS PDCCH, CRC (cyclic redundancy check) is masked with SPS C-RNTI (cell radio network temporary identifier) and NDI is set to 0 (NDI=0). Hence, a UE does not perform SPS Tx/Rx directly despite receiving allocation on a subframe (simply, SPS subframe) on which SPS should be performed through RRC signaling. In case of receiving SPS PDCCH indicating SPS activation (or reactivation), the UE performs SPS Tx (e.g., PUSCH transmission) or SPS Rx (e.g., PDSCH reception) in the subframe assigned by RRC signaling. SPS Tx/Rx is performed in the corresponding subframe using RB allocation information and MCS information in SPS PDCCH. Meanwhile, if receiving PDCCH indicating SPS release, the UE stops SPS Tx/Rx. If SPS PDCCH indicating activation (or reactivation) is received, the stopped SPS Tx/Rx is resumed using RB allocation, MCS and the like designated by the SPS PDCCH in the subframe assigned through RRC signaling.

In case of SPS activation, DCI field of SPS PDCCH is set as Table 8. The field combination in Table 8 is used as a virtual CRC for SPS activation PDCCH validation.

TABLE 8

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Virtual CRC is used to detect error additionally by checking whether a corresponding field value is an agreed value. Although error is generated from DCI assigned to another UE, if the corresponding UE fails to detect the corresponding error and recognizes it as SPS scheduling activation of its own, since the corresponding UE continues to use the corresponding resource, one-time error causes problems persistently. Hence, SPS's incorrect detection is prevented using virtual CRC.

In case of SPS release, DCI field of SPS PDCCH is set as Table 9. DCI field combination of Table 9 is used as virtual CRC for SPS release PDCCH validation. In case of SPS release, a UE sends ACK/NACK for SPS release PDCCH.

TABLE 9

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1' s | N/A |
| HARQ process number | N/A | FDD: set to '000' TDD: set to '0000' |
| Modulation and coding scheme | N/A | set to '11111' |

TABLE 9-continued

| | DCI format 0 | DCI format 1A |
|---|---|---|
| Redundancy version | N/A | set to '00' |
| Resource block assignment | N/A | Set to all '1' s |

An operation scheme of uplink SPS is described in detail as follows. First of all, a BS (base station) informs a UE (user equipment) of a subframe (e.g., 20 ms interval), on which SPS operation should be performed, through upper layer (e.g., RRC) signaling. Then, the BS can send the UE SPS PDCCH indicating SPS activation. SPS PDCCH includes UL grant information. In this case, for UL transmission, the UE receives allocation of specific RB, MCS and the like, which are specified by SPS PDCCH, in 20 ms interval after receiving a UL grant message by SPS signaling. Hence, the UE can perform UL transmission using RB and MCS specified by SPS PDCCH in every 20 ms. Thus, in case of a PUSCH signal transmitted in the course of SPS operation, there is no corresponding PDCCH. For clarity, PUSCH according to SPS shall be named SPS PUSCH. A downlink (DL) SPS operation is performed similarly. In particular, after receiving SPS activation PDCCH having a DL grant, the UE may receive a DL signal (e.g., PDSCH) using RB and MCS specified by SPS PDCCH in every 20 ms. In case of a PDSCH signal transmitted in the course of SPS operation, there is no corresponding PDCCH. For clarity, PDSCH according to SPS shall be named SPS PDSCH.

In case of SPS PDCCH, there is no corresponding PDCCH. In this sense, SPS PDCCH may be referred to as PDSCH without PDCCH. Thus, as described with reference to FIG. 6 and Equation 1, it is impossible to allocate a PUCCH resource for ACK/NACK transmission using CCE that configures PDCCH. To solve it, the LTE system configures a PUCCH resource candidate set for ACK/NACK transmission with respect to SPS PDSCH through upper layer signaling and explicitly indicates one PUCCH resource in the PUCCH resource candidate set through SPS activation PDCCH. A value indicating a PUCCH resource may be transmitted through a TPC (transmit power control) field of SPS activation PDCCH.

Table 10 shows a PUCCH resource index for DL SPS defined in LTE. Referring to the table, 4 PUCCH resource indexes are configured by an upper layer and a single PUCCH resource index can be indicated through TPC field (TPC command) of SPS activation PDCCH.

TABLE 10

| Value of 'TPC command for PUCCH' | $n^{(1)}_{PUCCH}$ |
|---|---|
| 00 | 1st PUCCH resource index configured by upper layer |
| 01 | 2nd PUCCH resource index configured by upper layer |
| 10 | 3rd PUCCH resource index configured by upper layer |
| 11 | 4th PUCCH resource index configured by upper layer |

Figure 10:
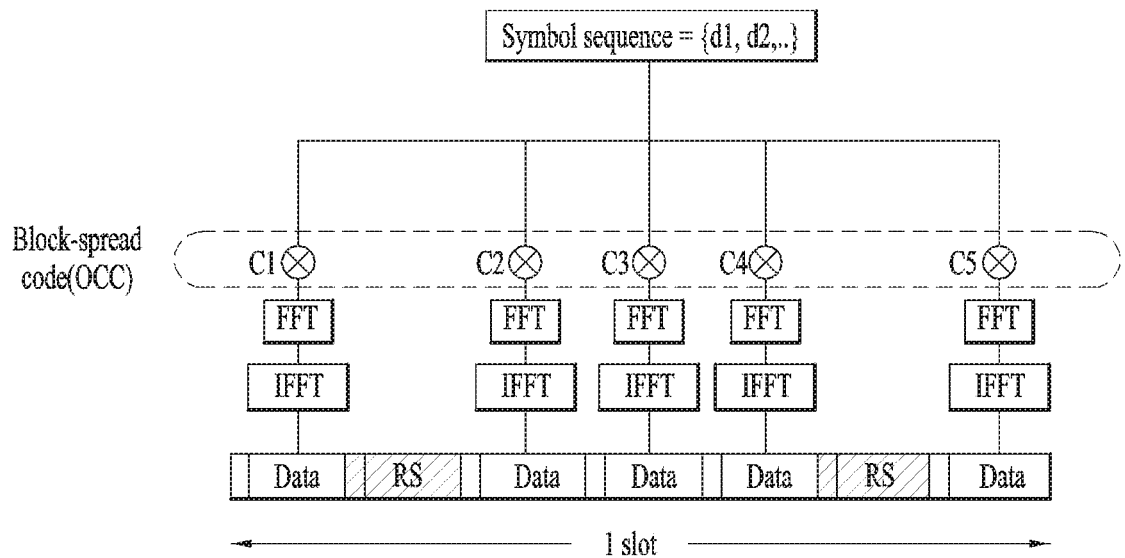
FIG. 10 illustrates the structure of PUCCH format 3 in a slot level.
Figure 11:
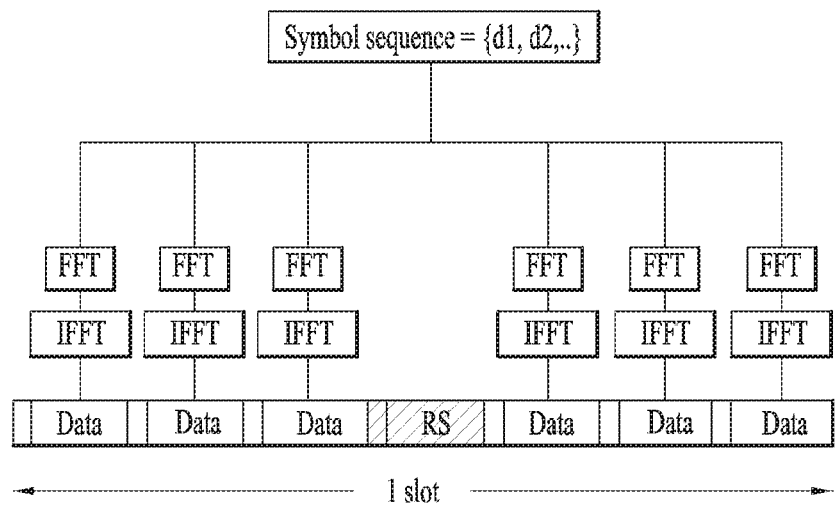
FIG. 11 illustrates the structure of PUCCH format 4 in a slot level.

FIG. 10 illustrates the structure of PUCCH format 3 in a slot level. PUCCH format 3 is used to transmit a plurality of ACK/NACK information, and information such as CSI and/or SR may be transmitted together.

Referring to FIG. 10, using OCCs C1 to C5 of a length-5 (SF(Spreading Factor)=5), 5SC-FDMA symbols (i.e., UCI data part) are generated from a single symbol sequence {d1, d2}. The symbol sequence {d1, d2} may mean a modulated symbol sequence or a codeword bit sequence. If the symbol sequence {d1, d2} means a codeword bit sequence, the block diagram of FIG. 12 further includes a modulated block. RS symbol can be generated from CAZAC sequence having a specific cyclic shift. RS can be transmitted in a manner of applying (multiplying) a specific PCC to a plurality of RS symbols in a time domain. Block-spread UCI is transmitted to a network through FFT (Fast Fourier Transform) process and IFFT (Inverse Fast Fourier Transform) process by SC-FDMA symbol unit.

PUCCH format 3 of a subframe level is described as follows. A symbol sequence {d'0~d'11} in a slot 0 is mapped to a subcarrier of one SC-FDMA symbol and also mapped to 5 SC-FDMA symbols by block-spreading using OCCs C1 to C5. Similarly, a symbol sequence {d'12~d'23} in a slot 1 is mapped to a subcarrier of one SC-FDMA symbol and also mapped to 5 SC-FDMA symbols by block-spreading using OCCs C1 to C5. Here, the symbol sequence {d'0~d'11} or {d'12~d'23} show in each slot indicates a form of applying FFT or FFT/IFFT to the symbol sequence {d1, d2} of FIG. 12. The total symbol sequence {d'0~d'23} is generated by joint-coding one or more UCIs. OCC is changeable by slot unit and UCI data may be scrambled by SC-FDMA symbol unit.

PUCCH format 3 resource can be given explicitly. In particular, a PUCCH resource set is configured by an upper layer (e.g., RRC) and a PUCCH resource to be used actually can be indicated using an ARI (ACK/NACK Resource Indicator) value of PDCCH.

Table 11 shows an example of indicating a PUCCH resource for HARQ-ACK explicitly.

TABLE 11

| Value (ARI) of HARQ-ACK resource for PUCCH | $n_{PUCCH}$ |
|---|---|
| 00 | 1st PUCCH resource value configured by upper layer |
| 01 | 2nd PUCCH resource value configured by upper layer |
| 10 | 3rd PUCCH resource value configured by upper layer |
| 11 | 4th PUCCH resource value configured by upper layer |

ARI: ACK/NACK Resource Indicator. In Table 11, an upper layer includes an RRC layer and an ARI value can be indicated through PDCCH that carries a DL grant. For example, an ARI value can be indicated using SCell scheduling PDCCH and/or a TPC field of at least one PCell scheduling PDCCH failing to correspond to a DAU initial value.

PUCCH format 4 is a PUCCH format that supports UCI transmission in payload size greater than that of PUCCH format 3. The structure of PUCCH format 4 is basically identical to that of PUCCH format 3 except that block-spreading is not applied. And, PUCCH format 4 resource can be explicitly given. In particular, a PUCCH resource set can be configured by an upper layer (e.g., RRC layer) and a PUCCH resource to be actually used can be indicated using an ARI value of PDCCH.

In an existing CA situation, as HARQ-ACK (for clarity, A/N) feedback transmission scheme, PUCCH format 1b with channel selection (for clarity, CHsel) method or PUCCH format 3 (or PUCCH format 4) (hereinafter generally named PF3) based method can be configured. First of all, the case of CHsel is basically applicable to a CA situation between 2 cells only and is a method of selecting/modulating and transmitting a specific one of a plurality of PUCCH format 1b (for clarity, PF1) resources according to A/N combination corresponding to each cell, i.e., A/N state for all CA. In particular, in case that cross-CC scheduling is configured (to schedule SCell from PCell), all (CHsel) candidate PF1 resources corresponding to each cell may be allocated as implicit PUCCH resources linked to DL grant transmission resource (e.g., (E)CCE) [cf. Equation 1]. Meanwhile, if cross-CC scheduling is not configured, a resource corresponding to PCell is allocated as implicit PF1 but a resource corresponding to SCell can be allocated as a specific one (e.g., one indicated by ARI (ACK/NACK resource indicator) in a DL grant for scheduling SCell) of a plurality of explicit PF1 (set) configured (in advance) through an upper layer signal (e.g., RRC (radio resource control) signal).

If 2 cells are merged, A/N information of 2~4 bits should be fed back depending on whether a transmission mode/bundling is applied to each cell. Table 12 exemplarily shows CHsel mapping table applied in case of providing a single HARQ-ACK response per cell.

TABLE 12

| HARQ-ACK(0) | HARQ-ACK(1) | $n_{PUCCH, i}^{(1)}$ | b(0)b(1) |
|---|---|---|---|
| ACK | ACK | $n_{PUCCH, 1}^{(1)}$ | 1, 1 |
| ACK | NACK/DTX | $n_{PUCCH, 0}^{(1)}$ | 1, 1 |
| NACK/DTX | ACK | $n_{PUCCH, 1}^{(1)}$ | 0, 0 |
| NACK | NACK/DTX | $n_{PUCCH, 0}^{(1)}$ | 0, 0 |
| DTX | NACK/DTX | | No Transmission |

In Table 12, $n_{PUCCH,i}^{(1)}$ (i=0,1) indicates a PUCCH resource index. $n_{PUCCH,0}^{(1)}$ can be linked to a CCE (e.g., a minimum CCE index) configuring a DL grant PDCCH corresponding to PDSCH of PCell [refer to Equation 1]. $n_{PUCCH,1}^{(1)}$ may be linked to a CCE (e.g., a minimum CCE index) configuring a DL grant PDCCH corresponding to PDSCH of SCell [e.g., case of cross-CC scheduling] or explicitly signaled by RRC [e.g., case of non-cross-CC scheduling]. b(0)b(1) indicates a bit value [refer to QPSK modulation in Table 7].

Referring to Table 12, after receiving one or more PDSCHs from a BS, a UE generates HARQ-ACK(0)(1) corresponding to the received PDSCH. The UE selects PUCCH resource (e.g., $n_{PUCCH,i}^{(1)}$) corresponding to HARQ-ACK(0)(1), and transmits a corresponding bit value (or a modulated value) through the selected PUCCH resource.

On the other hand, the PF3 method is applicable to a situation among maximum 5 cells and includes a method of configuring A/N (bit) corresponding to each cell into a single payload intactly and mapping/transmitting a coded bit, which is generated from applying a series of coding (e.g., Reed Muller (RM) code) process, on PF3 resource. In this case, PF3 resource used for A/N transmission can be allocated as a specific one (e.g., indicated by ARI in a DL grant for scheduling SCell) of a plurality of PF3s configured (in advance) through an upper layer signal (e.g., RRC) (irrespective of a presence or non-presence of cross-CC scheduling configuration). In particular, even in a situation that PF3 is configured for A/N transmission, if scheduling is performed on PCell (FDD case) or one SF in PCell (TDD case) (i.e., DL grant is detected), A/N corresponding to the corresponding scheduling is transmitted only using implicit PF1 linked to DL grant [such an operation is called fallback]. Otherwise, A/N for all CA configuration cells can be transmitted using PF3 indicated by ARI.

In a TDD based CA system, a plurality of HARQ-ACK feedbacks for DL data reception in a plurality of cells can be transmitted through a single UL SF. HARQ-ACK feedback corresponding to each cell can be configured with a plurality of HARQ-ACKs (i.e., A/N) for DL data reception in a specific DL SF set (for clarity, a bundling window, cf. Table 6) within the corresponding cell. In TDD based CA, A/N feedback can be efficiently performed based on DAI (downlink assignment index) signaling within DL/UL grant (DG/UG). DAI indicates a sequence value of DL scheduling (e.g., PDCCH) within a bundling window.

Embodiment: Method for Low-Latency Communication

Low-latency based data transmission is considered as one of significant technical requirements of the next generation system after LTE-A. For this, it is able to consider improving SPS based scheduling without being accompanied by control information signaling. Particularly, for efficient configuration in aspects of resource and latency for SPS based scheduling, it is able to consider extending SPS, which is currently allowed to be configured for PCell only, so as to be configurable for SCell. Moreover, in order to support SPS based scheduling having less latency, it is able to consider configuring SPS based scheduling having a period (e.g., 1 ms [SF]) smaller than an SPS period currently defined as minimum 10 ms [SF]. The present invention proposes a control signaling and UE operating method for SPS based scheduling improvement. In the present invention, PDCCH may include EPDCCH that is a control channel in form of being transmitted through an existing PDSCH region (i.e., data region in FIG. 3).

(1) DCI Transmission Indicating Activation/Release for SPS on SCell

In order to configure and operate SPS based scheduling on SCell, it is able to consider the following method. It is able to configure the SPS based scheduling to be performed through specific SCell (hereinafter, SPS SCell) (instead of PCell). Hence, SPS relevant parameters (e.g., SPS based PDSCH/PUSCH transmission period, etc.) configured through upper layer signaling (e.g., RRC signaling) can be provided for the corresponding SPS SCell only. In this case, a UE can perform an SPS C-RNTI based DCI detection operation (indicating SPS activation/release) for a USS corresponding to SPS SCell only (instead of CSS/USS corresponding to PCell). SPS SCell may be indicated by upper layer signaling (e.g., RRC signaling) or defined as SCell having a (per-cell group) specific cell (e.g., a smallest cell index).

According to another method, SPS based scheduling can be configured to be performed through one of PCell and SCell (at a single timing (e.g., SF), whereby SPS relevant parameter (e.g., SPS PDSCH/PUSCH period) configured through upper layer signaling can be provided in common to both PCell and SPS SCell or individually/independently. In this case, a UE can perform an SPS C-RNTI based DCI detection operation on both CSS/USS corresponding to PCell and USS corresponding to SPS SCell. Hence, the UE can perform an activation/release operation on SPS on a cell corresponding to a search space from which the corresponding DCI is detected.

According to further method, an SPS based PDSCH transmission performed cell and an SPS based PUSCH transmission performed cell can be configured independently (e.g., differently). For example, one of SPS PDSCH and SPS PUSCH is configured in PCell in an existing manner and the other is configured in SPS SCell.

(2) UE Operation Related to Deactivation for SPS Configured SCell

If deactivation is performed on or applied to SCell (i.e., SPS SCell) in which SPS based scheduling is configured (activated), the following UE operation can be considered. SCell activation/deactivation can be indicated through MAC (medium access control) signaling. Moreover, after SCell has been activated, if a predetermined time expires, SCell can be automatically deactivated (i.e., timer-based deactivation). If SCell is activated, the following normal operations are performed.

SRS transmissions on the SCell;
CQI/PMI/RI/PTI reporting for the SCell;
PDCCH monitoring on the SCell;
PDCCH monitoring for the SCell.

On the other hand, if SCell is deactivated, SCell operations are restricted as follows.

not transmit SRS on the SCell;
not report CQI/PMI/RI/PTI for the SCell;
not transmit on UL-SCH on the SCell;
not monitor the PDCCH on the SCell;
not monitor the PDCCH for the SCell.

If SPS SCell is deactivated, SPS based scheduling configured in SPS SCell can be released automatically. Hence, during a deactivation interval of SPS SCell, a UE can stop an SPS C-RNTI based DCI detection operation on USS corresponding to SPS SCell, stop an SPS PDSCH/PUSCH Tx/Rx operation on SPS SCell, and flush an SPS PDSCH/PUSCH Tx/Rx buffer.

According to another method, through a signal indicating deactivation of SPS SCell, it is able to inform a UE of whether to release SPS based scheduling configured in SPS SCell. Similarly, through a signal indicating SCell activation, it is able to inform a UE of whether to activate SPS based scheduling configured in the corresponding SCell. If SPS release is indicated through an SPS SCell deactivation signal, the UE can stop an SPS C-RNTI based DCI detection for SPS SCell and an SPS PDSCH/PUSCH Tx/Rx operation during a deactivation interval and flush an SPS PDSCH/PUSCH Tx/Rx buffer. Thereafter, if SCell is reactivated, the UE can resume the stopped SPS PDSCH/PUSCH Tx/Rx operation. In this case, it is unnecessary for the UE to receive a command indicating SPS activation.

(3) HARQ-ACK Transmission Considering SPS Based PDSCH Reception on SCell

Regarding SPS PDSCH transmission on SCell in aspect of HARQ-ACK (i.e., A/N) feedback for DL scheduling, the following matters can be considered. Since SPS PDSCH has no corresponding PDCCH, it needs to be handled differently from normal PDSCH.

There is no implicit PUCCH format 1a/1b (i.e., PF1) resource linked to PDCCH.

Since ARI is signaled through PDCCH, there is no ARI indicating A/N transmission resource (e.g., one of a plurality of explicit PUCCH resources allocated through RRC). Here, a plurality of the explicit PUCCH resources may include PF3 resources.

Considering this, proposed is an A/N transmitting method in a situation that SPS based PDSCH transmission on SCell is configured. The present invention may correspond to a case that PUCCH format 3/4/5 (hereinafter called PF3) is configured for A/N feedback.

(a) FDD Case

If PDSCH on PCell and/or SPS PDSCH on SCell is received only, since there is no PDCCH corresponding to SPS PDSCH, there is no ARI indicating PF3 resource. Namely, in a state that normal PDSCH (i.e., non-SPS PDSCH) on SCell is not received, if SPS PDSCH on SCell is received, since there is no PDCCH corresponding to SCell PDSCH, there is no ARI indicating PF3 resource. To solve such a problem, based on a scheme of PF1 with channel selection (CHsel) using implicit PF1 resource (hereinafter, PCell resource) linked to DL grant PDCCH corresponding to PCell PDSCH and explicit PF1 resource (hereinafter, SPS resource) allocated for the A/N transmission usage for SPS PDSCH, it is able to simultaneously transmit A/N for two PDSCHs [hereinafter, A/N fallback].

Meanwhile, the A/N fallback situation may include a case of receiving PDSCH corresponding to PDCCH indicating activation of SCell SPS (instead of SPS PDSCH on SCell) or PDCCH indicating release of SCell SPS. In this case, irrespective of cross/self-CC scheduling, SPS resource can be allocated as PUCCH resource corresponding to SPS SCell. In another way, if SPS SCell is configured to be cross-CC scheduled from PCell, implicit PF1 resource linked to SPS activation/release PDCCH can be allocated as PUCCH resource corresponding to SPS SCell [hereinafter, SPS RA]. In this case, if SPS SCell is configured to be self-CC scheduled, SPS resource can be allocated as PUCCH resource corresponding to SPS SCell. Here, HARQ feedback is not applied to SPS activation PDCCH, and the matter relevant to SPS activation PDCCH is applied to a first SPS PDSCH. On the other hand, an HARQ process is applied to SPS release PDCCH and the above matter is applied to a case of performing HARQ feedback on SPS release PDCCH.

According to another method, it is able to consider a method of signaling an ARI indicating PF3 resource (i.e., one of a plurality of PF3 resources) in PDCCH indicating activation and/or release for SCell SPS [hereinafter, SPS ARI]. Hence, if receiving PDCCH indicating activation and/or release of SCell SPS, a UE can transmit A/N for the whole cells configuring CA using PF3 resource indicated by the ARI in the corresponding PDCCH. Hence, only if receiving PDSCH on PCell and/or SPS PDSCH on SCell, the proposed CHsel scheme is applicable. And, PF3 scheme is applicable to the rest of cases including activation/release PDCCH of SCell SPS. Namely, if receiving activation/release PDCCH of SCell SPS or normal PDSCH (i.e., non-SPS PDSCH) on SCell, PF3 scheme is applicable. The mater about activation PDSCH of SCell SPS is applicable to a case of performing HARQ feedback on a first SPS PDSCH.

Meanwhile, in a situation that SPS PDSCH on PCell and/or SPS PDSCH on SCell is received, if (positive) SR transmission is required at a corresponding A/N transmission timing, A/N having spatial bundling applied per cell to PCell and SCell can be transmitted through SR PUCCH resource. Here, the spatial bundling includes applying a logical-AND operation to A/N bit of each cell (by SF unit). Moreover, when simultaneous transmission of A/N and periodic CSI is set to be allowed and periodic CSI transmission is required at an A/N transmission timing, if A/N fallback is applied, 1) A/N having spatial bundling applied per cell is transmitted together with periodic CSI in form of PUCCH format 2b or 2) A/N can be transmitted in a manner of applying CHsel scheme to A/N for two cells only by dropping periodic CSI transmission.

(b) TDD Case

In case of receiving PCell PDSCH corresponding to DAI=1 and/or SPS based SCell PDSCH only, since there is no PDCCH corresponding to SPS PDSCH, there is no ARI indicating PF3 resource. Namely, in a state that PCell PDSCH corresponding to DAI=2~4 is not received or that normal PDSCH (i.e., non-SPS PDSCH) on SCell is not received, if SPS PDSCH on SCell is received, since there is no PDCCH corresponding to SCell PDSCH, there is no ARI indicating PF3 resource. To solve such a problem, based on CHsel scheme that uses implicit PF1 resource (i.e., PCell resource) linked to DL grant PDCCH corresponding to PCell DAI=1 and explicit PF1 resource (i.e., SPS resource) allocated for the A/N transmission usage for SPS PDSCH, it is able to simultaneously transmit A/N for the corresponding two PDSCHs [A/N fallback]. Moreover, for the PUCCH resource allocation and PUCCH format determination for the A/N transmission, SPS RA scheme and SPS ARI scheme are applicable to a case of TDD identically/similarly.

Meanwhile, in a situation that 'DAI=1' based PCell PDSCH and/or SPS based SCell PDSCH is received only, if a (positive) SR transmission is required at a corresponding A/N transmission timing, a per-cell spatial-bundled A/N or the number ACKs therein may be transmitted through SR PUCCH resource. Moreover, if A/N fallback is applied to a case that simultaneous transmission of A/N and periodic CSI is set to be allowed and that a periodic CSI transmission is required at an A/N transmission timing, 1) the per-cell spatial bundled A/N or the number of ACKs therein may be transmitted together with periodic CSI in form of PUCCH format 2b, or 2) A/N for two cells can be transmitted by dropping the periodic CSI transmission and applying the proposed CHsel scheme.

4) Timing of Applying Activation/Release for SPS Having Short Period

In case of considering configuration/application of SRS based scheduling having a period (e.g., 1 ms [SF]) smaller than an existing period (e.g., 10 ms [SF]), a time interval between an SPS activation PDCCH reception timing and a corresponding initial SPS PDSCH/PUSCH transmission timing and a time interval between an SPS release PDCCH reception timing and a corresponding SPS PDSCH/PUSCH transmission stop timing may need to be matched between a UE and a BS. This is because it may be efficient in aspects of UL resource use (e.g., whether SPS PUSCH resource can be used for another usage from a prescribed timing) and UL signal processing (e.g., whether UCI feedback will be transmitted through PUSCH on a prescribed cell, whether UL signal power on a prescribed cell will be (further) scaled down in a power limitation situation).

Considering this, if SPS based PDSCH/PUSCH transmission having a period smaller than an existing period (e.g., over 10 ms [SF]) or a period (e.g., 1 ms [SF]) equal to or lower than a specific level is configured, SPS PDSCH/PUSCH transmission corresponding to the corresponding activation can start from a timing SF #(n1+k1) (SPS configuration timing/period closest after inclusion) for SPS activation PDCCH received in SF # n1. Moreover, for SPS release PDCCH received in SF # n2, SPS PDSCH/PUSCH transmission can be stopped (by applying SPS release thereto) from a timing SF # (n2+k2) (SPS configuration timing/period closest after inclusion). Namely, although SPS release PDCCH is received, SPS PDSCH/PUSCH transmission is not stopped directly but maintained during k2 SFs. Here, k1 and k2 may have the same value, e.g., k1=k2=d.

Considering a minimum time interval between PUSCH transmission timings, d can be set to 4. Here, a period of a specific level may be equal to or smaller than (k1+k2) (or 2d) ms [SF].

(5) Retransmission Operation for Short Period SPS Based PUSCH Transmission

In a situation that SPS based scheduling having a period (e.g., 1 m [SF]) smaller than an existing period is configured/applied, it is highly probable that a synchronous HARQ based retransmission timing (e.g., SF #(n+2d)) for a first SPS PUSCH (initial) transmission at a specific timing (e.g., SF # n) (particularly, in case of SPS based PUSCH transmission) overlaps with an (initial) transmission timing of a second SPS PUSCH. In this situation, although PHICH for SPS PUSCH (initial) transmission in SF # n from a BS is transmitted through SF #(n+d), as a UE incorrectly receives the PHICH, if PHICH error is generated, it may cause a problem to a PUSCH Rx buffer of the BS. For example, although the BS sends PHICH-NACK, the UE may receive it as ACK incorrectly. In this case, although the UE performs initial transmission of new UL data through SPS PUSCH resource in SF #(n+2d), the BS can expect retransmission for the previous SPS PUSCH. On the contrary, although the BS sends PHICH-ACK, the UE may receive it as NACK incorrectly. In this case, although the UE performs retransmission for the previous SPS PUSCH through SPS PUSCH resource in SF #(n+2d), the BS may expect initial transmission of new UL data. Here, a period of a specific level may be equal to or smaller than (k1+k2) (or 2d) ms [SF] [refer to (4)]. Or, a specific level may be equal to or smaller than HARQ transmission period (e.g., 8 ms [SF]).

In view of this, in a situation that SPS based PUSCH transmission having a small specific period (e.g., 1 ms [SF]) is configured/applied, in case that a retransmission timing (e.g., SF #(n+2d)) for SPS PUSCH (initial) transmission at a specific timing (e.g., SF # n) overlaps with an SPS PUSCH (initial) transmission timing or in order to be prepared for this case, information (e.g., 1-bit indicator) indicating whether the corresponding PUSCH is an initial transmission of new UL data or a retransmission for the previous SPS PUSCH can be included in PUSCH transmitted through SF #(n+2d). The indicator can be assigned to a specific position (e.g., a first position) in all information bits/modulated symbols within PUSCH. Here, indication information can be limitedly included only if an SPS PUSCH initial transmission timing and an SPS PUSCH retransmission timing overlap with each other. Moreover, the indication information can be included only if SPS based PDSCH/PUSCH transmission having a period smaller than an existing period (e.g., over 10 ms [SF]) or a period (e.g., 1 ms [SF]) equal to or lower than a specific level is configured.

As another method, it is able to consider a scheme of differently using/applying parameters (e.g., PUSCH PRB (Physical Resource Block) index, DMRS (Demodulation Reference Signal) base sequence, DMRS cyclic shift, OCC (Orthogonal Cover Code), PUSCH scrambling sequence/parameter, etc.) used for PUSCH transmission depending on whether PUSCH transmitted through SF #(n+2d) is initial transmission of new UL Data or retransmission for previous SPS PUSCH.

Figure 12:
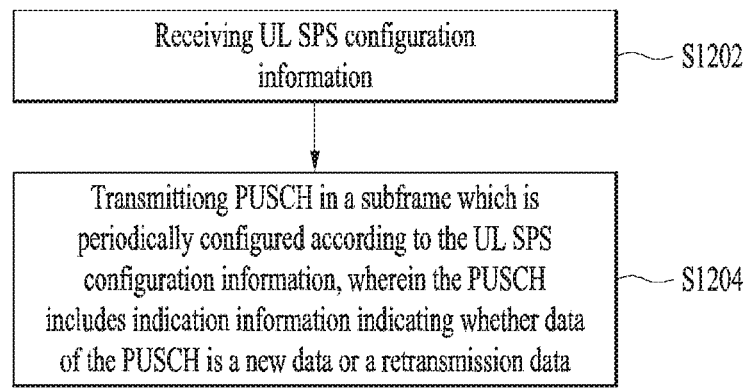
FIG. 12 exemplarily shows a signal transmitting process according to the present invention.

FIG. 12 shows a signal transmitting method according to one example of the present invention.

Referring to FIG. 12, a UE can receive SPS configuration information from a BS [S1202]. The SPS configuration information is transmitted through upper layer signaling (e.g., RRC signaling) and includes information (e.g., SF period/offset) on an SPS performed subframe. Thereafter, the UE can transmit PUSCH in a subframe periodically configured according to uplink SPS configuration information [S1204]. Here, PUSCH may contain indication information indicating whether data in PUSCH is new SPS data or retransmission SPS data. According to an implementation scheme, the indication information can be identified by a 1-bit indicator. The indication information can be identified based on a PUSCH transmitted PRB index. The indication information can be identified based on a sequence used for DMRS of PUSCH. And, the indication information can be identified based on a scrambling sequence used for PUSCH.

Meanwhile, in a situation that retransmission for a previous SPS PUSCH and an initial transmission of new UL data are simultaneously required through SF #(n+2d), 1) the retransmission for the previous SPS PUSCH is preferentially performed and the initial transmission of the new UL data is delayed (e.g., a very next SPS PUSCH transmission timing) (appropriate for a case that SPS period is very small), or 2) the UE selects and transmits one of the two data according to a priority between UL data in aspect of delay and delays transmission for non-transmitted data (e.g., a very next SPS PUSCH transmission timing) (appropriate for a case that SPS period is relatively large).

The proposed method of the present invention is identically applicable not only to SPS based scheduling but also to a scheduling scheme (e.g., a BS periodically allocates an available frequency resource in a specific time duration and a UE performs transmission of UL channel/signal as well as UL data using the corresponding periodic frequency resource in the corresponding time duration (partially, if necessary)) of a type similar to the SPS based scheduling.

Figure 13:
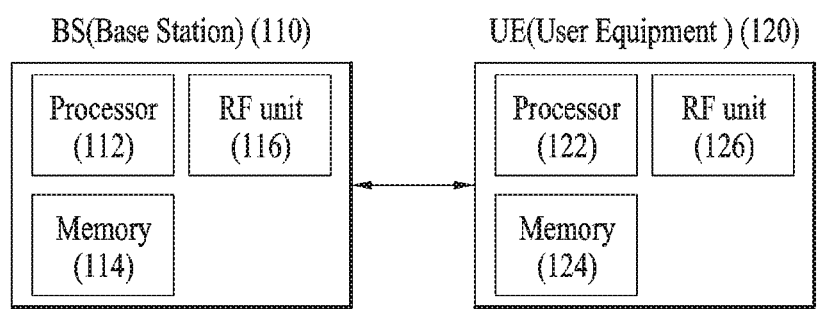
FIG. 13 illustrates a base station and a user equipment applicable to an embodiment of the present invention.

FIG. 13 illustrates a BS and a UE of a wireless communication system, which are applicable to embodiments of the present invention. When the wireless communication system includes a relay, the BS or UE can be replaced by the relay.

Referring to FIG. 13, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a UE, a BS or a relay.

What is claimed is:

1. A method of performing uplink transmission by a user equipment (UE) in a wireless communication system, the method comprising:
    performing a previous semi-persistent scheduling (SPS) transmission; and
    performing the uplink transmission at a time unit where a new SPS transmission is required based on an SPS period,
    wherein, based on a retransmission timing of the previous SPS transmission being same as the time unit in a situation that the SPS period is shorter than a specific value, the uplink transmission includes one of a retransmission of the previous SPS transmission or the new SPS transmission, with a 1-bit indicator for indicating whether the uplink transmission includes the retransmission of the previous SPS transmission or the new SPS transmission,
    wherein, based on (i) the retransmission timing of the previous SPS transmission not being same as the time unit or (ii) the SPS period not being shorter than the specific value, the uplink transmission includes the new SPS transmission without the 1-bit indicator, and
    wherein the 1-bit indicator is included in the uplink transmission only in a status where both of following conditions are satisfied:
    (a) the SPS period is shorter than the specific value; and
    (b) the previous SPS transmission collides with the new SPS transmission in the said time unit.

2. The method of claim 1, wherein the specific value corresponds to 10 time units.

3. The method of claim 1, wherein the retransmission timing of the previous SPS transmission is determined based on a synchronous Hybrid ARQ (HARQ) timing.

4. The method of claim 1, wherein the wireless communication system includes a 3rd generation partnership project (3GPP)-based wireless communication system.

5. A user equipment (UE) configured to perform uplink transmission in a wireless communication system, the UE comprising:
    a radio frequency (RF) unit; and
    a processor connected to the RF unit and configured to:
        perform a previous semi-persistent scheduling (SPS) transmission, and
        perform the uplink transmission at a time unit where a new SPS transmission is required based on an SPS period,
    wherein, based on a retransmission timing of the previous SPS transmission being same as the time unit in a situation that the SPS period is shorter than a specific value, the uplink transmission includes one of a retransmission of the previous SPS transmission or the new SPS transmission, with a 1-bit indicator for indicating whether the uplink transmission includes the retransmission of the previous SPS transmission or the new SPS transmission,
    wherein, based on (i) the retransmission timing of the previous SPS transmission not being same as the time unit or (ii) the SPS period not being shorter than the specific value, the uplink transmission includes the new SPS transmission without the 1-bit indicator, and
    wherein the 1-bit indicator is included in the uplink transmission only in a status where both of following conditions are satisfied:
    (a) the SPS period is shorter than the specific value; and
    (b) the previous SPS transmission collides with the new SPS transmission in the said time unit.

6. The UE of claim 5, wherein the specific value corresponds to 10 time units.

7. The UE of claim 5, wherein the retransmission timing of the previous SPS transmission is determined based on a synchronous Hybrid ARQ (HARQ) timing.

8. The UE of claim 5, wherein the wireless communication system includes a 3rd generation partnership project (3GPP)-based wireless communication system.

9. A method of performing uplink reception by a base station (BS) in a wireless communication system, the method comprising:
    performing a previous semi-persistent scheduling (SPS) reception; and
    performing the uplink reception at a time unit where a new SPS reception is required based on an SPS period,
    wherein, based on a re-reception timing of the previous SPS reception being same as the time unit in a situation that the SPS period is shorter than a specific value, the uplink reception includes one of a re-reception of the previous SPS reception or the new SPS reception, with a 1-bit indicator for indicating whether the uplink transmission includes the re-reception of the previous SPS reception or the new SPS reception, wherein, based on (i) the re-reception timing of the previous SPS reception not being same as the time unit or (ii) the SPS period not being shorter than the specific value, the uplink reception includes the new SPS reception without the 1-bit indicator, wherein the 1-bit indicator is included in the uplink transmission only in a status where both of following conditions are satisfied:

(a) the SPS period is shorter than the specific value; and
(b) the previous SPS transmission collides with the new SPS transmission in the said time unit.

10. The method of claim 9, wherein the specific value corresponds to 10 time units.

11. The method of claim 9, wherein the re-reception timing of the previous SPS reception is determined based on a synchronous Hybrid ARQ (HARQ) timing.

12. The method of claim 9, wherein the wireless communication system includes a 3rd generation partnership project (3GPP)-based wireless communication system.

13. A base station (BS) configured to perform uplink reception in a wireless communication system, the BS comprising:
  a radio frequency (RF) unit; and
  a processor connected to the RF unit and configured to:
  performing a previous semi-persistent scheduling (SPS) reception; and
  performing the uplink reception at a time unit where a new SPS reception is required based on an SPS period, wherein, based on a re-reception timing of the previous SPS reception being same as the time unit in a situation that the SPS period is shorter than a specific value, the uplink reception includes one of a re-reception of the previous SPS reception or the new SPS reception, with a 1-bit indicator for indicating whether the uplink transmission includes the re-reception of the previous SPS reception or the new SPS reception, wherein, based on (i) the re-reception timing of the previous SPS reception not being same as the time unit or (ii) the SPS period not being shorter than the specific value, the uplink reception includes the new SPS reception without the 1-bit indicator, and wherein the 1-bit indicator is included in the uplink transmission only in a status where both of following conditions are satisfied:

(a) the SPS period is shorter than the specific value; and
(b) the previous SPS transmission collides with the new SPS transmission in the said time unit.

14. The BS of claim 13, wherein the specific value corresponds to 10 time units.

15. The BS of claim 13, wherein the re-reception timing of the previous SPS reception is determined based on a synchronous Hybrid ARQ (HARQ) timing.

16. The BS of claim 13, wherein the wireless communication system includes a 3rd generation partnership project (3GPP)-based wireless communication system.

* * * * *